United States Patent
Suzuki et al.

(10) Patent No.: US 9,382,453 B2
(45) Date of Patent: Jul. 5, 2016

(54) PAINT FILM-PROTECTING SHEET

(75) Inventors: Toshitaka Suzuki, Ibaraki (JP); Takeshi Igarashi, Ibaraki (JP); Hiroko Ikenaga, Ibaraki (JP); Yuki Saitou, Ibaraki (JP); Shinji Inokuchi, Ibaraki (JP); Koji Yamaguchi, Hiratsuka (JP); Yoshikuni Hirano, Hiratsuka (JP)

(73) Assignees: NITTO DENKO CORPORATION, Ibaraki-Shi (JP); KANSAI PAINT CO. LTD., Hiratsuka-Shi (JP)

( * ) Notice: Subject to any disclaimer, the term of this patent is extended or adjusted under 35 U.S.C. 154(b) by 595 days.

(21) Appl. No.: 12/951,337

(22) Filed: Nov. 22, 2010

(65) Prior Publication Data

US 2011/0126983 A1 Jun. 2, 2011

(30) Foreign Application Priority Data

Nov. 27, 2009 (JP) .................... 2009-270139

(51) Int. Cl.
*B32B 27/32* (2006.01)
*C09J 123/22* (2006.01)
*C09J 7/02* (2006.01)

(52) U.S. Cl.
CPC ............... *C09J 7/0267* (2013.01); *B32B 27/32* (2013.01); *C09J 123/22* (2013.01); *C09J 2203/306* (2013.01); *C09J 2203/31* (2013.01); *C09J 2423/006* (2013.01); *Y10T 428/28* (2015.01); *Y10T 428/2878* (2015.01)

(58) Field of Classification Search
None
See application file for complete search history.

(56) References Cited

U.S. PATENT DOCUMENTS

| | | | |
|---|---|---|---|
| 3,502,497 A * | 3/1970 | Crocker | .................. 428/311.11 |
| 4,312,902 A * | 1/1982 | Murase et al. | ................ 427/386 |
| 5,601,917 A | 2/1997 | Matsui et al. | |
| 5,747,132 A | 5/1998 | Matsui et al. | |
| 5,948,517 A * | 9/1999 | Adamko et al. | .............. 428/219 |
| 6,030,702 A | 2/2000 | Matsui et al. | |
| 6,037,054 A | 3/2000 | Shirai et al. | |
| 6,083,613 A | 7/2000 | Hayashi et al. | |
| 6,309,730 B1 * | 10/2001 | Sumi | ............................. 428/141 |

(Continued)

FOREIGN PATENT DOCUMENTS

| CN | 1537897 | 10/2004 |
|---|---|---|
| CN | 101233203 | 7/2008 |

(Continued)

OTHER PUBLICATIONS

Human translation of FR 1450512 A (1996).*

(Continued)

*Primary Examiner* — Frank D Ducheneaux
(74) *Attorney, Agent, or Firm* — J-Tek Law PLLC; Jeffrey D. Tekanic; Scott T. Wakeman

(57) ABSTRACT

A paint film-protecting sheet (1) is provided which effectively prevents adhesive transfer to the paint film. The paint film-protecting sheet (1) has a pressure-sensitive adhesive layer which is comprised of a non-crosslinking pressure-sensitive adhesive (20) adjacent a polyolefin-based resin film serving as a supporting substrate (10). At least a surface portion (12) of the supporting substrate that adjoins the pressure-sensitive adhesive layer satisfies the following conditions: (1) it has an indentation modulus at 25° C. ($Er_{(25)}$) of from 200 MPa to 1,100 MPa and (2) it has an indentation modulus at −5° C. ($Er_{(-5)}$) of from 400 MPa to 2,400 MPa.

20 Claims, 1 Drawing Sheet

(56) References Cited

U.S. PATENT DOCUMENTS

| | | | |
|---|---|---|---|
| 6,329,049 B1 | 12/2001 | Shirai et al. | |
| 6,335,090 B1 * | 1/2002 | Shirai et al. | 428/343 |
| 6,358,600 B1 | 3/2002 | Hayashi et al. | |
| 6,436,531 B1 | 8/2002 | Kollaja et al. | |
| 6,559,234 B1 * | 5/2003 | Arai et al. | 525/245 |
| 2005/0042444 A1 | 2/2005 | Bohm et al. | |
| 2005/0165205 A1 * | 7/2005 | Lange et al. | 528/272 |
| 2006/0240252 A1 | 10/2006 | Takahashi et al. | |
| 2007/0172649 A1 * | 7/2007 | Aihara | C09J 7/021 428/343 |
| 2007/0249798 A1 * | 10/2007 | Stevens | B32B 27/32 526/348 |
| 2008/0202663 A1 | 8/2008 | Behrens et al. | |
| 2008/0220249 A1 | 9/2008 | Saitou et al. | |
| 2009/0123739 A1 | 5/2009 | Saitou et al. | |
| 2009/0130360 A1 * | 5/2009 | Damman et al. | 428/41.3 |
| 2009/0162679 A1 * | 6/2009 | Asami | C08G 18/0823 428/461 |
| 2010/0136321 A1 | 6/2010 | Uesugi et al. | |
| 2010/0151233 A1 | 6/2010 | Suzuki et al. | |
| 2010/0151237 A1 | 6/2010 | Igarashi et al. | |
| 2011/0129655 A1 | 6/2011 | Suzuki et al. | |

FOREIGN PATENT DOCUMENTS

| | | | |
|---|---|---|---|
| CN | 101255320 | | 9/2008 |
| EP | 1 995 288 A1 | | 11/2008 |
| FR | 1450512 A | * | 6/1966 |
| JP | H07-179830 A | | 7/1995 |
| JP | 8-143838 A | | 6/1996 |
| JP | H11-193367 A | | 7/1999 |
| JP | 2001-323229 A | | 11/2001 |
| JP | 2002-146309 A | | 5/2002 |
| JP | 2005-213280 A | | 8/2005 |
| JP | 2008307674 A | | 12/2008 |
| JP | 2013175629 A | | 9/2013 |
| WO | 2008/032691 A1 | | 3/2008 |

OTHER PUBLICATIONS

Communication from EPO dated May 4, 2011 in counterpart EP application No. 10192723.4-2102, including European Search Opinion, European Search Report and claims searched and examined by the EPO.

Communication from the Chinese Patent Office mailed Jul. 1, 2013 in counterpart CN application No. 201010566709.X, including Office Action and Search Report, including English translation thereof.

Communication from the Chinese Patent Office mailed Sep. 9, 2013 in counterpart CN application No. 201010566685.8, including Office Action and Search Report, including English translation thereof.

Office Action from the Japanese Patent Office mailed Dec. 5, 2013 in counterpart JP application No. 2009-270138, including English translation thereof.

Office Action from the Japanese Patent Office mailed Dec. 5, 2013 in counterpart JP application No. 2009-270139, including English translation thereof.

Office Action mailed Apr. 2, 2014 from Chinese Patent Office for related Chinese application No. 201010566709.X, including English translation thereof.

Submission of Information and References in related Japanese patent application No. 2009-270138, mailed to Applicant Apr. 3, 2014, including English translation thereof.

Office Action from the Japanese Patent Office mailed Aug. 14, 2014 in counterpart JP application No. 2009-270138, including English translation thereof.

Office Action from the Chinese Patent Office mailed Oct. 10, 2014 in related CN application No. 201010566709.X, including English translation thereof.

* cited by examiner

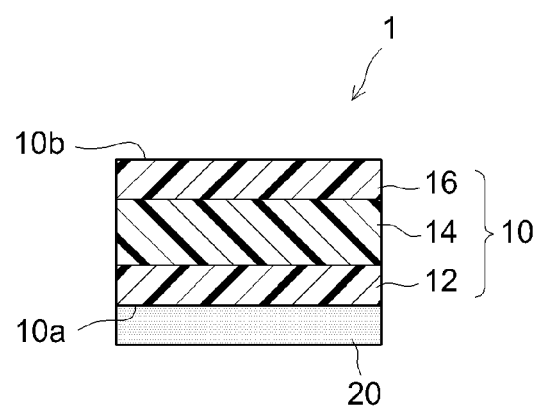

PAINT FILM-PROTECTING SHEET

CROSS-REFERENCE

This application claims priority to Japanese Patent Application No. 2009-270139 filed on Nov. 27, 2009, the entire contents of which are incorporated herein by reference.

BACKGROUND OF THE INVENTION

1. Field of the Invention

The present invention relates to a sheet for protecting a paint film from damage such as scratches and dirt.

2. Description of the Related Art

Techniques are known for adhering a protective sheet to a paint film disposed on an article (e.g., painted automobiles and automotive components, building materials, sheet metal such as sheet steel and shaped articles thereof) in order to prevent damage to the paint film surface, for example, during transporting, storing, curing or constructing the article. Paint film-protecting sheets used for such a purpose generally have a pressure-sensitive adhesive (PSA) layer on one side of a sheet-shaped substrate made of resin, and are constructed to perform its protective purpose by bonding the protecting sheet to the adherend surface (the paint film to be protected) via the PSA layer. Examples of background art documents relating to paint film-protecting sheets include Japanese Patent Nos. 2832565 (U.S. Pat. No. 5,747,132), 2,832,579 and 2,832,589 (U.S. Pat. No. 5,601,917).

It is desirable for paint film-protecting sheets to have the property that no adhesive residues (typically some of the PSA forming the PSA layer) from the sheet remain on the surface of the paint film (a phenomenon known as "adhesive transfer") after the paint film-protecting sheet has been stripped (removed) from the surface of a paint film, when it is no longer needed for protective purposes. Known approaches for preventing adhesive transfer include disposing a prescribed anchoring agent between the substrate and the PSA. For instance, in the working examples disclosed in Japanese Patent Application Publication No. 2005-213280, an anchoring agent layer (e.g., ethylene-vinyl acetate copolymer or ethylene-methacrylic acid copolymer) is provided between a polypropylene film serving as the substrate and an acrylic-based PSA, and the effects of such a layer were assessed.

SUMMARY OF THE INVENTION

It is preferable for the PSA layer provided in a paint film-protecting sheet to be comprised of a non-crosslinking PSA. When the protective sheet is affixed to a paint film, such a non-crosslinking type PSA layer does not easily build up strain in its interior and does not readily leave marks, traces or residues (hereinafter simply "marks") on the paint film, thereby making it suitable for use as the PSA layer in a paint film-protecting sheet. As for the substrate of the paint film-protecting sheet, a resin film comprised primarily of polyolefin (a polyolefin film) is preferred in order to optimize weather resistance and other desirable properties. However, as compared with common acrylic-based PSAs and natural rubber-based PSAs, prior attempts to utilize non-crosslinking PSAs (e.g., PSAs in which the base polymer is polyisobutylene) have exhibited an insufficient adherence to polyolefin film substrates. Moreover, in recent years, the demand for a higher quality appearance of paint films has further intensified as part of an effort to increase the value of the goods (automobiles, etc.). Hence, there exists a desire for techniques which can better prevent adhesive transfer. A paint film-protecting sheet would be advantageous that is capable of having an improved ability to prevent adhesive transfer (adhesive transfer resistance), not only on paint films having a high smoothness, e.g., the surface of a new automobile, but even when the protective sheet is used on paint films having an undesirable surface state from the standpoint of preventing adhesive transfer, such as an automotive paint film after the vehicle has been used (e.g., a paint film exhibiting small surface irregularities, such as a paint film that has been polished and/or touched up).

It is therefore an object of the present teachings to provide a paint film-protecting sheet comprised of a non-crosslinking type PSA layer disposed on a polyolefin film, which sheet is better able to prevent against adhesive transfer to a paint film.

One representative example of a paint-film protecting sheet disclosed herein includes a supporting substrate and a PSA layer disposed on the substrate. The PSA layer is comprised of (comprises) a non-crosslinking PSA. The substrate is comprised of (comprises) a resin film which contains one or more polyolefins selected from polyethylene (PE) and polypropylene (PP), wherein the amount of the polyolefin (the combined amount when two or more polyolefins are included) accounts for at least 50 wt % of the entire substrate. Further, the surface portion of the substrate that is adjacent the PSA layer (also referred to as the "front portion" hereinbelow) is comprised of (comprises) a resin material that satisfies both of the following conditions (1) and (2):

(1) it has an indentation modulus at 25° C. ($Er_{(25)}$) of from 200 MPa to 1,100 MPa; and (2) it has an indentation modulus at −5° C. ($Er_{(-5)}$) of from 400 MPa to 2,400 MPa.

Indentation modulus is also known in the art as "reduced Young's modulus" and these terms are used interchangeably in the present description.

Herein, the expression "PSA layer comprised of a non-crosslinking PSA" is understood as meaning a PSA layer which, at the time of PSA layer formation, is not deliberately treated (i.e., subjected to a crosslinking treatment, such as by admixing a crosslinking agent) so as to form chemical (covalent) bonds between the polymers making up the PSA. Because strain does not build up significantly in such PSA layers (even if strain temporarily arises, it can be easily dissipated), non-crosslinking PSA layers have properties that are highly suitable for PSA layers to be used in paint film-protecting sheets; for example, when the sheet is affixed to and then removed from a paint film, such PSA layers do not readily leave marks on the paint film.

In the protective sheet thus constituted, it is possible for the PSA layer to exhibit excellent adherence to the front side (the side on which the PSA layer is provided) of the supporting substrate, thereby enabling adhesive transfer to the paint film to be prevented to a high degree. For example, this enables the protective sheet to exhibit better adhesive transfer resistance, even with respect to surfaces prone to adhesive transfer, such as surfaces that have been polished and/or touched up. The protective sheet thus constituted has excellent handling properties (e.g., ease of use during attachment to the adherend and stripping therefrom). The supporting substrate may be, for example, a film or sheet formed by T-die extrusion.

In one embodiment of the paint film-protecting sheet disclosed herein, at least a surface portion (i.e. a front portion) of the substrate which adjoins the PSA layer is formed of a resin material containing at least 20 wt % of linear low-density polyethylene (LLDPE) having a density d of 0.925 g/cm³ or less. A paint film-protecting sheet having an even better ability to prevent adhesive transfer can be achieved with such a supporting substrate.

In one embodiment of the paint film-protecting sheets disclosed herein, the resin material (i.e. the resin material comprising at least the front portion of the substrate) includes a propylene copolymer having a melt mass flow rate (MFR) between 0.5 and 2.0 g/10 min, as measured in accordance with JIS K7210, which is corresponding to ISO 1133, at 230° C. and under a load of 21.18 N by method A thereof. A paint film-protecting sheet having an even better ability to prevent adhesive transfer can be achieved with a supporting substrate, in which at least the front portion is comprised of a resin material that includes a propylene copolymer having the above MFR in addition to the above LLDPE.

The resin material of a paint film-protecting sheet disclosed herein may preferably contain no homopolypropylene, or may contain homopolypropylene in a proportion of 60 wt % or less (e.g., from 10 to 60 wt %) of the entire resin material. Paint film-protecting sheets, in which at least the front portion of the supporting substrate is comprised of (comprises) a resin material of the above composition, have a good ability to prevent adhesive transfer, and may also exhibit excellent handling properties (e.g., ease of use during attachment to the adherend and stripping therefrom).

In yet another embodiment of the paint film-protecting sheet disclosed herein, the resin material includes one or both of a linear low-density polyethylene and a propylene copolymer in a combined amount of at least 30 wt % of the entire resin material. A paint film-protecting sheet in which at least the front portion of the supporting substrate is formed of a resin material having this composition is able to achieve an even better resistance to adhesive transfer.

In yet another embodiment of the paint film-protecting sheets disclosed herein, the supporting substrate preferably has a tensile modulus of elasticity at 23° C. of from 350 MPa to 850 MPa. Paint film-protecting sheets with such a supporting substrate have a good ability to prevent adhesive transfer and are capable of exhibiting excellent handling properties (e.g., ease of use during attachment and stripping and/or handling properties during manufacture of the paint film-protecting sheet).

In a further embodiment of the paint film-protecting sheets disclosed herein, the PSA forming the PSA layer preferably contains an isobutylene polymer as the base polymer. A paint film-protecting sheet having such a PSA layer is preferred because, when attached to and then removed from a paint film (e.g., the exterior paint coat on an automobile), it does not readily leave marks on the paint film.

BRIEF DESCRIPTION OF THE DRAWING

FIG. 1 is a schematic cross-sectional view of a representative embodiment of the paint film-protecting sheet according to the present teachings.

DETAILED DESCRIPTION OF THE INVENTION

Preferred embodiments of the present invention will be described below. Technical matters necessary to practice the invention, other than those specifically referred to in the present description, may be understood as design matters for a person skilled in the art that are based on the related art in the pertinent field. The present invention may be practiced based on the information disclosed herein and common general technical knowledge in the pertinent field.

A representative paint film-protecting sheet (e.g., an automotive paint film-protecting sheet used to protect automobiles and automotive parts) preferably comprises a PSA layer provided on a sheet-shaped supporting substrate. For example, as shown schematically in FIG. 1, the paint film-protecting sheet 1 is comprised of a supporting substrate 10 having a PSA layer 20 provided or disposed on one side (front side) 10a, and is used by attaching the PSA layer 20 to an adherend (an object to be protected, e.g., an object having a paint film, such as an automobile or an automotive part). Prior to using the paint film-protecting sheet 1 (i.e. prior to attachment to the adherend), the outer surface (adhering surface) of the PSA layer 20 may be protected with a release liner (not shown) having a release surface facing at least the PSA layer. Alternatively, the other side (back side) 10b of the supporting substrate 10 may be designed as a release surface and, by winding the paint film-protecting sheet 1 into the form of a roll, the PSA layer 20 comes into direct contact with the back side 10b so that the surface of the PSA layer 20 is protected. The supporting substrate 10 has a structure which may be composed of a single layer or may be comprised of a plurality of layers that include at least two layers of differing composition. For example, FIG. 1 shows a supporting substrate 10 composed of three layers: a front layer 12 forming the side adjoining the PSA layer (front side) 10a, a back layer 16 forming the back side (e.g., release surface) 10b and an intermediate layer 14 disposed therebetween.

According to the present teachings, the supporting substrate is preferably a resin film (e.g., polyolefin film) which includes one or more polyolefins selected from polyethylene and/or polypropylene, and the amount of the polyolefin (when two or more polyolefins are included, the combined amount thereof) preferably accounts for at least 50 wt % of the entire substrate. In other words, at least 50 wt % of the entire supporting substrate is made of polyethylene and/or polypropylene. This supporting substrate may have a single-layer structure or may have a multilayer structure of two or more layers. In order to optimize the balance between the thickness and the elastic modulus of the film, a supporting substrate having a multilayer structure is advantageous.

The above polyethylene may be one or more of a variety of polymers containing ethylene as an ingredient (ethylene-based polymers). The ethylene-based polymer may be a homopolymer of ethylene or may be a polymer obtained from the copolymerization of ethylene as the primary monomer with another α-olefin (random copolymerization, block copolymerization or the like). Preferred examples of such α-olefins include α-olefins having 3 to 10 carbon atoms such as propylene, 1-butene (may be branched 1-butene), 1-hexene, 4-methyl-1-pentene and 1-octene. Alternatively, the polyethylene resin may be a copolymer of ethylene with a monomer having both a polymerizable functional group and also another functional group (functional group-containing monomer), or a resin obtained by copolymerizing such a functional group-containing monomer with an ethylene-based polymer. Representative examples of copolymers of ethylene and functional group-containing monomers include ethylene-vinyl acetate copolymers (EVA), ethylene-acrylic acid copolymers (EAA), ethylene-methacrylic acid copolymers (EMAA), ethylene-methyl acrylate copolymers (EMA), ethylene-ethyl acrylate copolymers (EEA), ethylene-methyl methacrylate copolymers (EMMA) and ethylene-(meth)acrylic acid (i.e. acrylic acid and/or methacrylic acid) copolymers that have been crosslinked with metallic ions.

The density of the polyethylene included in the supporting substrate, although not subject to any particular limitation, may be, for example, from about 0.89 to about 0.94 g/cm$^3$. Preferred polyethylenes include low-density polyethylene (LDPE) (e.g., LDPE having a density of from about 0.91 to about 0.93 g/cm$^3$) and linear low-density polyethylene LLDPE (e.g., LLDPE having a density of from about 0.89 to 0.93 g/cm³). The supporting substrate may optionally contain one or more types of LDPE and one or more types of LLDPE, either as a blend or separately (e.g., as the materials forming mutually differing layers in a supporting substrate having a multilayer structure). The ratio between the amounts in which these respective polyethylenes are used (blending ratio), although not subject to any particular limitation, may be suitably selected so as to provide a supporting substrate having the desired properties.

The polypropylene may be one or more of a variety of polymers containing propylene as an ingredient (propylene-based polymers). As used herein, the scope of the term "propylene polymer" encompasses, for example, polypropylenes such as the following:

propylene homopolymers (in other words, homopolypropylenes, sometimes referred to as "PP-h" hereinafter), such as isotactic polypropylene, syndiotactic polypropylene and atactic polypropylene;

random copolymers (random polypropylenes) (sometimes referred to as "PP-r" hereinafter) of propylene with another α-olefin (typically, one or more selected from ethylene and α-olefins having 4 to 10 carbon atoms), preferably PP-r in which propylene is the primary monomer (i.e., a monomeric ingredient that accounts for at least 50% by mass of the entire monomer); for example, PP-r obtained by the random copolymerization of from 96 to 99.9 mol % propylene and from 0.1 to 4 mol % of another α-olefin (preferably ethylene and/or butene);

copolymers (block polypropylenes, sometimes referred to as "PP-b" hereinafter) obtained by block-copolymerizing propylene with another α-olefin (typically one or more selected from ethylene and α-olefins having 4 to 10 carbon atoms), in which the PP-b preferably contains propylene as the primary monomer and typically includes also as a byproduct a rubber component comprised of propylene and at least one other α-olefin; representative examples include PP-b containing a polymer obtained by copolymerizing from 90 to 99.9 mol % of propylene with from 0.1 to 10 mol % of another α-olefin (preferably ethylene and/or butene), and containing also as a byproduct a rubber component comprised of propylene and at least one other α-olefin;

reactor blend-type thermoplastic olefin resins (TPO) and thermoplastic elastomers (TPE) obtained by copolymerizing a large amount of a rubber component with propylene polymers such as the above, or dry blend-type TPO resins and TPE resins obtained by mechanically dispersing such a rubber component; and copolymers of a monomer having, in addition to polymerization functional groups, other functional groups (functional group-bearing monomers) and propylene, as well as copolymers obtained by copolymerizing such a functional group-bearing monomer with a propylene-based polymer.

The supporting substrate may include one or more such polypropylenes. When the supporting structure includes two or more polypropylenes, the polypropylenes may be used as a blend or may be used separately (e.g., as materials forming mutually differing layers in a supporting substrate having a multilayer structure). The ratio between the amounts in which these respective polypropylenes are used (blending ratio), although not subject to any particular limitation, may be suitably selected so as to provide a supporting substrate having the desired properties. The polypropylene content (when two or more polypropylenes are included, the combined amount thereof) may be, for example, from 25 to 95 wt % of the entire supporting substrate. If the PP content of the overall supporting substrate is too low, the preferred tensile modulus disclosed herein may be difficult to achieve for certain applications of the present teachings. The PP content in the resin material forming the front portion of the supporting substrate may be set to, for example, from 5 to 80 wt %. If the PP content in the resin material is too low or too high, the preferred indentation modulus disclosed herein may be difficult to achieve for certain applications of the present teachings.

The above supporting substrate may be a substrate containing, as secondary or auxiliary ingredients, resin ingredients other than polyethylene and polypropylene. Examples of such resin ingredients include polyolefin resins comprised primarily of a polymer of an α-olefin having 4 or more carbon atoms (i.e. an olefin-based polymer in which the primary monomer is an α-olefin of this type).

The supporting substrate of the present teachings may be characterized, in preferred embodiments, in that at least the surface portion of the supporting substrate, which adjoins the PSA layer, exhibits indentation moduli Er at measurement temperatures of 25° C. and −5° C. that fall within specific respective numerical ranges. In other words, at least the front portion of the supporting substrate (or even up to the entire supporting substrate) is comprised of (comprises) a resin material exhibiting indentation moduli at 25° C. and −5° C. ($Er_{(25)}$ and $Er_{(-5)}$) that fall within specific respective numerical ranges. As used herein, "indentation modulus Er" or "reduced Young's modulus Er" refers to a value obtained by perpendicularly indenting a sample to a depth of 100 nm (nanoindentation) from the surface using a Berkovich diamond indenter under prescribed temperature conditions, then calculating the indentation modulus based on the relationship between the displacement and the load (applied force) at that time and on the surface area of indentation. For example, the indentation modulus measured in accordance with the indentation test disclosed in the subsequently described examples may be used.

The indentation modulus at 25° C. ($Er_{(25)}$) of the front portion is typically from 200 MPa to 1,100 MPa (e.g., from 200 MPa to 1,050 MPa), and may be from 600 MPa to 1,100 MPa (e.g., from 600 MPa to 1,050 MPa). The indentation modulus at −5° C. ($Er_{(-5)}$) of the front portion is typically from 400 MPa to 2,400 MPa (e.g., from 400 MPa to 2,150 MPa), and may be from 1,000 MPa to 2,400 MPa (e.g., from 1,000 MPa to 2,150 MPa). If either $Er_{(25)}$ or $Er_{(-5)}$ is larger than the respective above range, the adhesive transfer resistance will have a tendency to decrease for certain applications of the present teachings. On the other hand, if either $Er_{(25)}$ or $Er_{(-5)}$ is smaller than the respective above range, the strength and handling properties (e.g., the ease of use during attachment and stripping) of the paint film-protecting sheet may have a tendency to diminish for certain applications of the present teachings.

Although not wishing to be bound by theory, an explanation will be offered as to why it is presently believed that the adhesive transfer resistance of the paint film-protecting sheet improves with the use of a supporting substrate in which the front portion has indentation moduli $Er_{(25)}$ and $Er_{(-5)}$ in specific ranges. One common technique for enhancing the adhesive transfer resistance is a method that prevents anchoring failure by increasing the interfacial bond strength between the surface (front) of the supporting substrate and the PSA. Specific means for enhancing the interfacial bond strength that are commonly used include, for example, subjecting the surface of the supporting substrate to a surface treatment such as corona treatment, and applying a primer (anchoring agent) to the surface of the supporting substrate. However, with non-crosslinking PSAs, it is more difficult to achieve an interfacial bond strength-enhancing effect by such means than with common acrylic-based PSAs and natural rubber-based PSAs. Hence, achieving a high adhesive transfer resistance has been a challenge.

The inventors have discovered that the stress distribution at the interface between the front of the supporting substrate in a paint film-protecting sheet and the PSA layer differs in accordance with the elastic modulus of the supporting substrate (especially the elastic modulus at the interface with the PSA; i.e., of the front portion), and that the behavior during peeling of the paint film-protecting sheet (and, in turn, the tendency for adhesive transfer to occur) differs considerably with differences in the stress distribution. This appears to be due to a large disparity in the elastic moduli of the supporting substrate and the PSA. Accordingly, the inventors conducted a detailed investigation of the relationship between the modulus of the front (surface) portion of the supporting substrate and the tendency for adhesive transfer to occur; as a result, the discovery was made that by specifying the modulus of the front portion of the supporting substrate as the indentation modulus Er and setting this indentation modulus at or below a predetermined value, the adhesive transfer resistance can be greatly improved, even in non-crosslinking PSAs. The reason appears to be that, by making the modulus of the front portion of the supporting substrate and the modulus of the PSA layer relatively close to each other, the supporting substrate is better able to follow deformation of the PSA during peeling of the paint film-protecting sheet, thereby enabling anchoring failure to be better prevented.

There is a possibility of paint film-protecting sheets (e.g., paint film-protecting sheets for exterior paint films on automotive bodies) being peeled off under various temperature conditions. The difference between the moduli of the supporting substrate and the front side tends to become larger under low-temperature conditions than at room temperature. According to the present teachings, by taking into consideration not only the indentation modulus at room temperature (25° C.), but also the indentation modulus at a low temperature (−5° C.), it is possible to achieve a paint film-protecting sheet which exhibits an excellent adhesive transfer resistance even under low-temperature conditions at which adhesive transfer has a tendency to occur.

Although not subject to any particular limitation, the ratio between the indentation modulus at 25° C. and the indentation modulus at −5° C. of the front portion of the supporting substrate ($Er_{(-5)}/Er_{(25)}$) may be typically 5.0 or less, such as 3.0 or less (e.g., from 1.5 to 3.0). In a preferred embodiment, ($Er_{(-5)}/Er_{(25)}$) is 2.0 or less (e.g., from 1.5 to 2.0). With such an embodiment, a paint film-protecting sheet can be achieved that exhibits better adhesive transfer resistance and handling properties over a broad temperature range.

The supporting substrate of the present teachings may be a single-layer supporting substrate, in which the entire supporting substrate is formed of the above resin material that forms the front portion, or it may be a supporting substrate having a multilayer structure, which includes a layer formed of the resin material as at least the front side (the surface on the side where the PSA layer is provided). In the alternative, it may be a supporting substrate having a multilayer structure comprised of a plurality of layers formed of the above resin material, which layers are provided on the front side and in other places (for example, the back side, i.e., the surface on the opposite side). In order to easily optimize the balance between the adhesive transfer resistance and other properties (e.g., handling properties), a supporting substrate having a multilayer structure is advantageous.

In one embodiment of the present teachings, the resin material forming the front portion includes at least LLDPE. The LLDPE included in the resin material may be one that has been synthesized (copolymerized) using ethylene and another α-olefin (e.g., one or more selected from 1-butene, 1-hexene, 4-methyl-1-penten, 1-octene, etc.). Of these, a resin material which includes LLDPE having a density d≤0.925 g/cm$^3$ (such LLDPE is sometimes referred to below as "LLDPE$_{d≤0.925}$") is preferred. It is possible to achieve a better adhesive transfer resistance with a resin material having such a composition. The content W of LLDPE$_{d≤0.925}$ in the resin material may be set to, for example, at least 20 wt % (typically from 20 to 100 wt %) of the resin material. For a good balance between the handling properties and other properties of the paint film-protecting sheet, preferred use may be made of a resin material in which W is from 20 to 50 wt % (e.g., from 20 to 40 wt %).

One possible reason for why the adhesive transfer resistance of the paint film-protecting sheet improves when the resin material contains LLDPE$_{d≤0.925}$ appears to be as follows. In general, low-density LLDPE tends to have longer and/or more numerous side chains than higher density LLDPE (e.g., LLDPE in which d>0.925 g/cm$^3$). Such low-density LLDPE readily forms molecular entanglements (i.e. readily intertwines) with the polymers (e.g., polyisobutylene) that form the non-crosslinking PSA. Taking advantage of such polymer chain entanglements (e.g., by entangling the polymer in the supporting substrate with the polymer in the PSA layer and thereby constraining the latter), the adherence of the PSA to the substrate can be effectively enhanced (e.g., the interlayer strength between the front layer 12 and the PSA layer 20 in a paint film-protecting sheet 1 constructed as shown in FIG. 1 is increased). The adhesive transfer resistance (anchoring ability) improving effect due to such polymer chain entanglement can be effectively achieved even in cases where chemical (covalent) bonds (crosslinkages) do not form between the material forming the PSA and the material forming the substrate. Accordingly, the above effects can also be effectively exhibited with respect to, for example, PSA in which the base polymer is an isobutylene polymer having substantially no crosslinking functional groups.

In one embodiment of the present teachings, at least some portion of the LLDPE$_{d≤0.925}$ included in the resin material is LLDPE having a density d≤0.920 g/cm$^3$. A more preferred adhesive transfer resistance can be achieved with such an embodiment. The lower limit in the density of the LLDPE used in this resin material is not subject to any particular limitation. From the standpoint of availability and other considerations, the use of LLDPE having a density d≥0.890 g/cm$^3$ is generally suitable.

Instead of LLDPE$_{d≤0.925}$, or in addition to LLDPE$_{d≤0.925}$, the resin material may also include LLDPE having a density d>0.925 g/cm$^3$ (LLDPE$_{d>0.925}$). Generally speaking, of the LLDPE included in the resin material, the proportion accounted for by LLDPE having a density d≤0.925 (preferably d≤0.920 g/cm$^3$, and more preferably d≤0.910 g/cm$^3$) may be set to, for example, at least 20 wt %, preferably at least 50 wt %, even more preferably at least 70 wt %, and most preferably at least 90 wt %. It is even possible for substantially all of the LLDPE included in the resin material (i.e., substantially 100 wt %) to be LLDPE$_{d≤0.925}$ (and preferably LLDPE$_{d≤0.920}$). The total content of LLDPE in the resin material (that is, the combined amount of LLDPE$_{d≤0.925}$ and the any optionally-used LLDPE$_{d>0.925}$) may be suitably selected by taking into account, for example, the film forming properties, the PSA composition coating properties and the handling properties (ease of use) of the paint film-protecting sheet. For example, the combined content of LLDPE in the resin material (i.e., the total content of LLDPE in the front portion of the film) may be set to from 20 to 70 wt %, and may preferably be set from 20 to 50 wt %.

The LLDPE content (in case two or more types of LLDPE are included, the combined content thereof) in the entire supporting substrate (which is typically a supporting substrate having a multilayer construction) may be, for example, from 5 to 70 wt % (typically, from 20 to 60 wt %).

Instead of LLDPE, or in addition to LLDPE, the resin material may also include PE other than LLDPE or PP. In one embodiment of the present teachings, the resin material may include at least a propylene copolymer. Representative examples of such propylene copolymers include the above-mentioned PP-r and PP-b. Such propylene copolymers may be used singly or may be used in a suitable combination of two or more thereof. The amount of propylene copolymer used (when two or more types of propylene copolymers are used, the combined amount thereof) may be set to, for example, from about 5 to about 80 wt %, and typically from about 10 to about 40 wt %, of the entire resin material. The MFR of the propylene copolymer may be from about 0.5 to about 80 g/10 min (e.g., from 0.5 to 10 g/10 min). As used herein, "MFR" refers to the melt mass flow rate, as measured in accordance with JIS K7210 at 230° C. and under a load of 21.18 N by Method A.

In a preferred embodiment, at least one type of propylene copolymer included in the resin material is preferably a propylene copolymer having a MFR of from 0.5 to 2.0 g/10 min. Of the propylene copolymer included in the resin material, at least 50 wt % (more preferably at least 75 wt %; e.g., substantially all) may be propylene copolymer having a MFR of from 0.5 to 2.0 g/10 min. Propylene copolymer having such a low MFR (i.e. it does not readily flow even when heated) generally has a relatively high molecular weight and a high degree of crystallization. Such a propylene copolymer is able to effectively constrain the polymer after entanglements or intertwining with the polymer in the PSA has occurred.

The resin material may be one which includes a combination of the above low-MFR propylene copolymer and LLDPE ($LLDPE_{d\leq 0.925}$ being especially preferred). The adhesive transfer resistance can be more effectively increased with a resin material having such a composition due to the synergistic effects thereof, because LLDPE, which readily entangles or intertwines with the polymer in the PSA, and low MFR propylene copolymer, which has a high PSA polymer binding effect, are present in the front portion of the supporting substrate.

The present teachings may be practiced in embodiments, e.g., wherein the resin material contains substantially no homopolypropylene (PP-h), or wherein the resin material contains LLDPE and also contains PP-h. In an embodiment in which the resin material contains PP-h, the content thereof may be set to, for example, 60 wt % or less (typically more than 0 but not more than 60 wt %, such as from 10 to 60 wt %) of the resin material. That is, the present teachings may be practiced in an embodiment in which the resin material contains from 0 to 60 wt % of PP-h. The PP-h content may be from 30 to 60 wt %. A paint film-protecting sheet, in which at least the front portion of the supporting substrate is comprised of a resin material of the above composition, is capable of having a good adhesive transfer resistance and excellent handling properties (e.g., ease of use during attachment and stripping).

The present teachings may be practiced as any of the following embodiments: an embodiment in which the resin material contains at least LLDPE, an embodiment in which the resin material contains at least a propylene copolymer, an embodiment in which the resin material contains at least LLDPE and a propylene copolymer, an embodiment in which the resin material contains at least LLDPE and PP-h, or an embodiment in which the resin material contains at least LLDPE, a propylene copolymer and PP-h. A paint film-protecting sheet having an excellent adhesive transfer resistance and handling properties can be achieved with a resin material having any one of such compositions. In an embodiment in which the resin material includes at least LLDPE and/or a propylene copolymer, the combined content of the LLDPE and the propylene copolymer is preferably at least 30 wt % (typically from 30 to 95 wt %), more preferably at least 40 wt %, and may be at least 50 wt %, of the entire resin material.

The present teachings may even be practiced as embodiments wherein at least 30 wt % (preferably at least 75 wt %, and more preferably at least 90 wt %) of the resin components included in the resin materials (i.e. exclusive of pigments and the like which may be optionally included) is comprised of $LLDPE_{d\leq 0.925}$ and propylene copolymer, is comprised of $LLDPE_{d\leq 0.925}$ and PP-h, or is comprised of $LLDPE_{d\leq 0.925}$, a propylene copolymer and PP-h. The resin material may even be one in which the resin components are substantially comprised of $LLDPE_{d\leq 0.925}$, a propylene copolymer and PP-h.

The thickness of the supporting substrate is not subject to any particular limitation, and may be suitably selected according to the intended purpose. Generally speaking, it is suitable to use a supporting substrate having a thickness of up to about 300 μm (e.g., from about 10 μm to about 200 μm). In a preferred embodiment of the paint film-protecting sheet disclosed herein, the thickness of the supporting substrate is from 25 μm to 200 μm (and more preferably from 30 μm to 100 μm, such as from 30 μm to 60 μm). Paint film-protecting sheets preparing using a substrate having such a thickness are preferred, for example, as automotive paint film-protecting sheets.

If such a supporting substrate has a multilayer structure, the thickness of the layer of the substrate which adjoins or is adjacent to the PSA layer may be set, e.g., to be at least 3 μm (e.g., from 3 μm to 50 μm), and preferably at least 5 μm (e.g., from 5 μm to 30 μm). If the thickness of the front layer is too small, it may be difficult to produce a supporting substrate in which the front layer uniformly covers the surface of another layer forming the substrate (the layer disposed adjacent to the back side of the front layer; i.e. the intermediate layer in the example shown in FIG. 1). Although not subject to any particular limitation, this thickness may be set to up to 50% (typically from 5 to 50%, such as from about 10 to 30%) of the overall thickness of the supporting substrate. It is possible to form a paint film-protecting sheet which has both a high adhesive transfer resistance and good handling properties with a supporting substrate constructed in this way.

In an embodiment of the present teachings, the supporting substrate preferably has a tensile modulus of elasticity at 23° C. of 350 MPa or more, such as 500 MPa or more. Paint film-protecting sheets having such a supporting substrate are capable of providing both a good adhesive transfer resistance and excellent handling properties (e.g., ease of use during attachment and stripping and ease of handling during production of the paint film-protecting sheet). The tensile modulus may even be 600 MPa or more. It is suitable for the tensile modulus to be generally 850 MPa or less, and preferably 750 MPa or less. If the tensile modulus of the supporting substrate is too high, there may be cases in which the adhesive transfer resistance-enhancing effect decreases. The tensile modulus of the supporting substrate can be measured in accordance with JIS K7161, which is corresponding to ISO 527-1, using the method described in the subsequent examples. As utilized herein, tensile modulus of elasticity is also synonymous with the terms "tensile modulus" and "modulus of elasticity in tension"; these terms are meant to be interchangeable.

Depending on which properties may be required of the supporting substrate, e.g., light-blocking properties, weather resistance, heat resistance, film-forming stability and adhesive properties, the supporting substrate may include, as needed, suitable ingredients for which inclusion in the substrate is allowed. For example, additives such as pigments (typically, inorganic pigments such as white pigments), fillers, antioxidants, light stabilizers (in a sense that is inclusive of radical scavengers and ultraviolet absorbers), slip agents, and anti-blocking agents may be suitably admixed. Examples of materials that may be suitably used as pigments or fillers include inorganic powders such as titanium oxide, zinc oxide and calcium carbonate. For example, advantageous use may be made of a highly weather-resistant type titanium oxide (typically, rutile-type titanium dioxide) coated on the particle surfaces with, for example, $SiO_2/Al_2O_3$. The amount of inorganic pigment and filler may be suitably selected while taking into consideration the extent of the effects obtained by such inclusion and the required moldability that is dependent on the resin sheet-forming process (e.g., T-die extrusion, blown-film extrusion). Generally speaking, it is preferable to set the amount of inorganic pigment and filler (in cases in which a plurality of types are included, the combined amount thereof) to from about 2 to about 20 parts by weight (e.g., from 4 to 20 parts by weight, and more preferably from 5 to 15 parts by weight) per 100 parts by weight of the resin component. The amount of the respective ingredients (additives) may be set to about the same level as the normal amount in the field of resin sheets used, for example, as supporting substrates in paint film-protecting sheets (e.g., automotive paint film-protecting sheets). In a supporting substrate having a multilayer structure, the type and concentration of the additives included in the respective layers may be the same or different.

The supporting substrate may be manufactured by suitably using a typical film-forming method known to the art. Representative examples include: a process in which a molding material formulated from the various ingredients that form the supporting substrate is melted, and the molten molding material is extruded in the form of a film from a linear slit provided in a flat die (T-die extrusion), and a process in which the above molten molding material is extruded in the form of a tube from a circular die, then inflated by blowing a gas such as air into the tube (blown-film extrusion). A polyolefin film extruded (formed into a film) by T-die extrusion is preferably used as the supporting substrate in the present teachings because of the desirable properties of such a film, including a good thickness precision (tolerance) and ease of use.

With respect to the supporting substrate (typically a resin sheet) 10 shown in FIG. 1, the surface 10a on the side where the PSA layer 20 is provided may be subjected to a surface treatment such as acid treatment, corona discharge treatment, ultraviolet irradiation treatment or plasma treatment. Alternatively, such surface treatment need not necessarily be carried out. If necessary, the back side 10b of the supporting substrate 10 on the side opposite of the side where the PSA layer 20 is provided may be subjected to a release treatment (e.g., a treatment that involves applying a conventional silicone, long-chain alkyl, or fluorine-based release treatment agent in the form of a thin film having a thickness of typically from about 0.01 µm to about 1.0 µm, e.g., from about 0.01 µm to about 0.1 µm). By applying such a release treatment agent, a paint film-protecting sheet 1 that has been wound into a roll can be easily and effectively unwound.

The PSA layer provided on the paint film-protecting sheet disclosed herein is preferably a PSA layer comprised of a non-crosslinking PSA. Representative examples of the non-crosslinking PSA include: PSAs in which the base polymer is an A-B-A type block copolymer rubber, an A-B-A type random copolymer, or a hydrogenation product (hydrogen addition product) thereof; and PSAs in which the base polymer is a butene polymer containing butene (inclusive of 1-butene, cis- or trans-2-butene, and 2-methylpropene (isobutylene)) as the main monomer. Specific examples of such A-B-A type block copolymer rubbers or A-B-A type random copolymers or hydrogenation products thereof include styrene-butadiene-styrene block copolymer rubber (SBS), styrene-butadiene random copolymer (SBR), styrene-isoprene-styrene block copolymer rubber (SIS), styrene-vinyl isoprene-styrene block copolymer rubber (SVIS), styrene-ethylene-butylene-styrene block copolymer rubber (SEBS), which is a hydrogenation product of SBS, styrene-isobutylene-styrene block copolymer rubber (SIBS), styrene-ethylene-propylene-styrene block copolymer rubber (SEPS), which is a hydrogenation product of SIS, and hydrogenated styrene-butadiene copolymer (H-SBR), which is a hydrogenation product of SBR. Specific examples of the butene polymer include isobutylene polymers, such as polyisobutylene and isobutylene-isoprene copolymers. Other examples of polymers that may serve as the base polymer of the non-crosslinking PSA include olefin polymers, such as propylene-α-olefin copolymers and propylene-ethylene-α-olefin copolymers.

In a preferred embodiment, the PSA forming or constituting the above PSA layer is a non-crosslinking PSA formed from a PSA composition containing an isobutylene polymer as the base polymer (polyisobutylene PSA). Because such a polyisobutylene PSA has a large solubility parameter (SP) difference with the paint film (e.g., automotive paint film), material transfer does not easily take place between the two, and attaching the protective sheet tends not to leave marks or traces (residue) on the paint film. Also, the PSA layer has a high modulus of elasticity, which is desirable in a PSA for adhesive sheets used in embodiments such as paint film-protecting sheets that are repeeled; i.e., a repeelable PSA.

The above isobutylene polymer may be an isobutylene homopolymer (homopolyisobutylene) or a copolymer in which the main monomer is isobutylene (in other words, a copolymer in which isobutylene is copolymerized at a ratio exceeding 50 mol %). The copolymer may be, for example, a copolymer of isobutylene and n-butylene, a copolymer of isobutylene and isoprene (e.g., butyl rubbers such as regular butyl rubber, chlorinated butyl rubber, brominated butyl rubber and partially-crosslinked butyl rubber), or a vulcanized form or modified form (e.g., one modified with functional groups, such as hydroxyl groups, carboxyl groups, amino groups, or epoxy groups) thereof. From the standpoint of adhesive strength stability (e.g., a characteristic that the adhesive strength does not rise excessively over time or due to the thermal history), examples of preferred isobutylene polymers include homopolyisobutylene and isobutylene-n-butylene copolymers. Of these, homopolyisobutylene is particularly preferred.

The PSA used in the paint film-protecting sheet disclosed herein may contain, if necessary, suitable ingredients (additives) whose inclusion in such PSAs is permitted. Examples of such additives include softeners, tackifiers, peeling aids, pigments, fillers, antioxidants, and light stabilizers (including radical scavengers, ultraviolet absorbers or the like).

Preferred examples of tackifiers that may be used include alkyl phenol resins, terpene phenol resins, epoxy resins, coumarone indene resins, rosin resins, terpene resins, alkyd resins, and hydrogenations thereof. When a tackifier is used, the amount thereof may be set to, for example, from approximately 0.1 to 50 parts by weight, per 100 parts by weight of the base polymer. Generally, it is preferable for the amount of tackifier included to be set to from 0.1 to 5 parts by weight per 100 parts by weight of the base polymer. Alternatively, the PSA may have a composition which is substantially free of tackifier.

Examples of softeners include low-molecular-weight rubber materials, process oils (typically paraffinic oils), petroleum-based softeners and epoxy compounds. Examples of peeling aids include silicone-based peeling aids, paraffinic peeling aids, polyethylene wax and acrylic polymers. When a peeling aid is used, the amount thereof may be set to, for example, from about 0.01 to about 5 parts by weight per 100 parts by weight of the base polymer. Alternatively, the PSA may have a composition which is substantially free of peeling aid(s). Examples of pigments or fillers include inorganic powders such as titanium oxide, zinc oxide, calcium oxide, magnesium oxide and silica. Light stabilizers, ultraviolet absorbers and antioxidants that may be used include the same as those in the substrate.

Each of these additives may be used either singly or as a combination of two or more types thereof. The amounts of the respective additives may be set to the same level as the ordinary amounts in the field of PSAs for paint film-protecting sheets (e.g., automotive paint film-protecting sheets). The combined amount of the above tackifiers and additives is preferably set to 30 parts by weight or less (and more preferably 15 parts by weight or less) per 100 parts by weight of the base polymer.

The thickness of the PSA layer is not subject to any particular limitation, and may be suitably set according to the intended object. Generally, a thickness of up to 100 µm (e.g., from 1 µm to 100 µm) is appropriate, a thickness from about 1 µm to about 50 µm is preferred, and a thickness of from about 3 µm to about 20 µm is more preferred. For example, the above range may be preferably used as the PSA layer thickness in an automotive paint film-protecting sheet.

Formation of the PSA layer may be carried out in general accordance with known methods of forming PSA layers in adhesive sheets. For example, preferred use may be made of a direct process wherein a PSA composition, in which a PSA layer-forming material containing the base polymer and any additives to be optionally included, is dissolved or dispersed in a suitable liquid medium that is directly applied (typically coated) onto a supporting substrate and dried to form the PSA layer. Alternatively, use may be made of a transfer process wherein the above PSA composition is applied onto a surface having good peelability (e.g., the surface of a release liner, or the release-treated back surface of the supporting substrate) and dried, thereby forming a PSA layer on the surface, following which the PSA layer is transferred to a supporting substrate. This PSA layer is typically formed continuously, although it may be also formed in a regularly-reoccurring (e.g., dotted or striped) pattern or in a random pattern depending on the intended goal and use thereof.

The paint film-protecting sheets disclosed herein may be ones having, in the adhesive transfer resistance tests carried out under the conditions mentioned in the subsequently described examples, an adhesive transfer surface area ratio of 10% or less (preferably 5% or less, and more preferably substantially 0%). In addition or in the alternative, they may be ones in which no webbing or stringing of PSA between adherend and the paint film-protecting sheet is observed in the above adhesive transfer resistance tests. Such paint film-protecting sheets are highly suitable as paint film-protecting sheets which are used by being attached to the exterior paint coat of an automobile.

According to the present teachings, a paint film-protecting sheet can be provided that attains, at a high level, two previously-contradictory properties of a sufficient adhesive strength suitable for paint film protection and an excellent adhesive transfer resistance. Because such a paint film-protecting sheet has highly reliable protection properties (peeling-off does not easily occur during the period of protection), it may be advantageously employed in various applications. It is especially preferable as a paint film-protecting sheet that is used by being adhered to an exterior paint film on an automobile. That is, the transport of automobiles is often carried out in a state in which the automobile is loaded onto a carrier (transport means), such as a truck or a freight car, and exposed to the environment (exposed to the wind). In such a manner of transport, as the carrier travels at high-speed (which may generally reach a top speed of about 80 to 100 km or more), the automobiles carried thereby are subjected to strong wind forces; as a result, the paint film-protecting sheet attached to the automobile (typical attachment sites include the hood, roof, side panels and doors of the automotive body) may flap in the wind and ultimately peel away from the paint film. However, it is possible to achieve a good balance of both a good adhesive strength suitable for preventing such peeling during transport (peeling due to the wind) and a good adhesive transfer resistance with the paint film-protecting sheets disclosed herein. By way of example, and not as a limitation, paint film-protecting sheets can be obtained that exhibit, in the adhesive strength measurements carried out under the conditions described in the subsequent examples, an adhesive strength of at least 8 N/25 mm (typically, from 8 to 15 N/25 mm, such as from 10 to 15 N/25 mm), and preferably at least 11 N/25 mm (e.g., from 11 to 15 N/25 mm), and that have an adhesive transfer surface area of 10% or less (preferably 5% or less, and more preferably substantially 0%).

EXAMPLES

Several experimental examples of the invention are described below, although these specific examples are not intended to limit the scope of the invention. In the description that follows, unless noted otherwise, all references to "parts" and "%" are based on weight.

The starting materials used to fabricate the supporting substrates in the examples below were as follows:

PP-h: A homopolypropylene available under the trade name "NOVATEC® PP FY4" (Japan Polypropylene Corporation);

PP-b1: A block polypropylene having a MFR=3.5, available under the trade name "J-452HP" (Prime Polymer Co., Ltd.);

PP-b2: A block polypropylene having a MFR=2.0, available under the trade name "PC 480A" (SunAllomer Ltd.);

PP-b3: A block polypropylene having a MFR=0.8, available under the trade name "NOVATEC® EG8" (Japan Polypropylene Corporation);

LLDPE-1: LLDPE having a density $d=0.925$ g/cm$^3$, available under the trade name "KERNEL KF 380" (Nihon Polyethylene Corporation); and LLDPE-2: LLDPE having a density $d=0.914$ g/cm$^3$, available under the trade name "ULTRAZEX 1520L" (Prime Polymer Co., Ltd.).

Production of Paint Film-Protecting Sheet

A paint film-protecting sheet 1 having a construction similar to that in FIG. 1 was produced in the following way.

The starting materials shown in Table 1 below were blended in the weight ratios indicated in the table, melted and kneaded within a three-layer coextrusion T-die film-forming apparatus, and formed into a film (T-die extrusion process) having a thickness ratio among the respective layers (front layer 12, intermediate layer 14 and back layer 16) of 2/5/3 and a total thickness of 40 μm, thereby producing supporting substrates 10 for the respective examples. In addition to the materials shown in Table 1, seven parts of $SiO_2/Al_2O_3$-coated rutile-type titanium dioxide (available from Ishihara Sangyo Kaisha, Ltd. under the trade name TIPAQUE® CR-95) and 0.2 part of a weathering stabilizer (Poly[[6-[(1,1,3,3-tetramethylbutyl)amino]-1,3,5-triazine-2,4-diyl][(2,2,6,6-tetramethyl-4-piperidinyl)imino]-1,6-hexanediyl[2,2,6,6-tetramethyl-4-piperidinyl)imino]]) available from Ciba Specialty Chemicals under the trade name CHIMASSORB® 944FDL) were also included in both the intermediate layer and the back layer.

A PSA solution was prepared by dissolving 100 parts of an isobutylene polymer as the base polymer and 0.4 part of a tackifier in an organic solvent. Two types of polyisobutylene produced by BASF under the trade names "OPPANOL® B-80" (polyisobutylene having a Staudinger Index ($J_o$) *$cm^3$/g of 113-143) and "OPPANOL® B-12SFN" (polyisobutylene having a Staudinger Index ($J_o$)*$cm^3$/g of 34.5-39.0) were used in a weight ratio of 75:25 as the isobutylene polymer. p-tert-Octyl phenol resin produced by Sumitomo Durez under the trade name "DUREZ® 19900" was used as the tackifier. This PSA solution was applied to the front side 10a (i.e., the surface of the front layer 12) of the supporting substrate obtained above in the respective examples, and then dried, thereby forming a PSA layer 20 having a thickness of 10 μm. Each of the paint film-protecting sheets in Examples 1 to 10 was prepared in this way.

The following tests were carried out on the paint film-protecting sheets or supporting substrates of Examples 1 to 6. These results are shown, together with the compositions of the supporting substrates in the respective examples, in Table 1.

Indentation Modulus

Indentation tests (hardness tests) were carried out on the front layer side surface of the supporting substrate in each example under the following conditions. The indentation moduli $Er_{(25)}$ and $Er_{(-5)}$ were determined from these results.
Measurement Apparatus and Conditions:
  Apparatus: A nanoindenter manufactured by Hysitron under the trade name "TRIBOSCOPE®"
  Indenter: Berkovich (three-sided pyramid)
  Indentation depth: 100 nm
  Measurement temperatures: two temperatures −5° C. and 25° C.
  Measurement atmosphere: vacuum (approximately $6\times10^{-3}$ Pa)
Measurement Method:
  Using the above apparatus, a Berkovich diamond indenter, which possessed an angle of 115 degrees between its edges, was perpendicularly indented to a depth of 100 nm from the sample surface under the respective measurement temperature conditions. Following removal of the indenter, the indentation modulus of the surface was determined by using the relationship between the resulting displacement and the load and using the theoretically computed depression (indentation) surface area (see *Handbook of Micro/Nano Tribology* (Second Edition), edited by Bharat Bhushan (CRC Press)).

Tensile Modulus of Elasticity

Test pieces in the form of narrow strips were cut from the supporting substrate in each example by cutting along the machine direction (MD) of the substrate. In accordance with JIS K7161, these test pieces were stretched in the machine direction under the following conditions, and a stress-strain curve was obtained. The tensile modulus of elasticity was determined by linear regression of a normalized curve between the two points at strains $\epsilon_1=1$ and $\epsilon_2=2$.
Tensile Modulus Measurement Conditions:
  Measurement temperature: 23° C. (measurement was started after holding the test piece at this temperature for at least 30 minutes)
  Test piece width: 10 mm
  Test rate: 300 mm/min
  Distance between chucks: 50 mm
  Adhesive Transfer Resistance To deliberately create a surface state where adhesive transfer readily occurs, a paint film surface was obtained by painting a 45 cm×30 cm steel plate with an alkyd-melamine paint (Kansai Paint Co., Ltd., trade name: AMILAC TM-13(RC)). The paint film surface was then polished vertically and horizontally for 5 minutes using a rotating electric polisher (Makita Corporation, model No. PV7001C), to which a wool buff pad (Hitachi Koki Co., Ltd., trade name: 959-721) was attached, rotating at 1500 rpm and using an abrasive agent (Sumitomo 3M Ltd., trade name: HARD 5982-1-L). Next, the abrasive agent on the surface was removed from the test piece using a flannel polishing cloth, thereby giving the adherend. The above operations were carried out in a standard environment of a temperature of 23±2° C. and 50±15% relative humidity.

Test pieces were prepared by cutting the paint film-protecting sheet in each example into a rectangular shape having a length (machine direction) of 70 mm and a width (transverse direction) of 50 mm. In order to make it easy to observe differences in the adhesive transfer resistance, a fold perpendicular to the machine direction was made in the test piece, which was then adhered under pressure to the adherend. The test piece was then held for 48 hours in the above standard environment, after which it was transferred to a −10° C. environment, in which adhesive transfer readily occurs, and held in this −10° C. environment for two hours. Next, the test piece was manually peeled from the adherend at a peel angle of about 10 degrees and a peel rate of about 0.3 m/min. The behavior of the PSA at the boundary between the adherend surface and the PSA layer was visually observed at this time, and the extent of webbing or stringing that occurred was rated at one of three levels: Excellent "Exc" (no webbing whatsoever), Good (substantially no webbing), and Not Good "NG" (webbing was observed). In addition, the adherend surface was visually examined after peeling and the ratio of the amount of surface area exhibiting adhesive transfer to the total adherence surface area on the test piece (the adhesive transfer surface area ratio) was determined.

Adhesive Strength

Test pieces were produced by cutting the paint film-protecting sheet obtained in each example into strips having a length (machine direction) of 150 mm and a width (transverse direction) of 25 mm. The surface of a paint film obtained by applying an alkyd-melamine paint (available from Kansai Paint Co., Ltd. under the trade name AMILAC TM-13 (RC)) to a steel plate was subjected to a polishing treatment as in the above-described adhesive transfer resistance test so as to prepare an adherend. The above test piece was adhered to the adherend in a standard environment adjusted to a temperature of 23±2° C. and a relative humidity RH of 50±15%. Adhesion was carried out by pressure bonding, wherein a 2 kg rubber roller specified in JIS Z 0237:2000 was passed once back-and-forth over the test piece at a rate of 3 m/min. After attachment, the adherend with the adhered test piece was maintained for 48 hours in a 23±2° C., 50±15% RH environment, following which the adhesive strength (N/25 mm) was measured using a tensile testing machine (AUTOGRAPH AG-10G, manufactured by Shimadzu Corporation) at a peel rate (crosshead speed) of 300 mm/min, a peel angle of 180° and a peel length of 100 mm. Measurements were carried out three times, and the average of the values obtained is shown as the measured value in Table 1.

TABLE 1

| Example | | 1 | 2 | 3 | 4 | 5 | 6 |
|---|---|---|---|---|---|---|---|
| Back layer (parts per weight) | PP-h | 53 | ← | ← | ← | ← | ← |
| | PP-b1 (MFR = 3.5) | 30 | | | | | |
| | LLDPE-1 (d = 0.925) | 10 | | | | | |
| Intermediate layer (parts per weight) | PP-h | 20 | ← | ← | ← | ← | ← |
| | LLDPE-1 (d = 0.925) | 73 | | | | | |
| Front layer (parts per weight) | PP-h | 45 | 45 | 10 | 45 | 100 | 65 |
| | PP-b1 (MFR = 3.5) | — | — | — | 25 | — | 15 |
| | PP-b2 (MFR = 2.0) | — | 15 | — | — | — | — |
| | PP-b3 (MFR = 0.8) | 25 | — | — | — | — | — |
| | LLDPE-1 (d = 0.925) | — | — | — | 30 | — | 20 |
| | LLDPE-2 (d = 0.914) | 30 | 40 | 90 | — | — | — |
| Indentation modulus $Er_{(25)}$ (MPa) | | 1,030 | 790 | 250 | 1,080 | 1,400 | 1,200 |
| Indentation modulus $Er_{(-5)}$ (MPa) | | 2,100 | 1,600 | 450 | 2,400 | 3,050 | 2,600 |
| $Er_{(-5)}/Er_{(25)}$ | | 2.0 | 2.0 | 1.8 | 2.2 | 2.2 | 2.2 |
| Tensile Modulus (MPa) | | 630 | 550 | 400 | 650 | 800 | 720 |
| Adhesive transfer surface area ratio (%) | | 0 | 0 | 0 | 2 | 100 | 100 |
| Webbing | | Exc | Exc | Exc | Good | NG | NG |
| Adhesive strength (N/25 mm) | | 11.0 | 11.5 | 12.1 | 11.2 | 9.8 | 10.7 |

As shown in Table 1, the paint film-protecting sheets in Examples 1 to 4, which satisfied both of the above conditions (1) and (2), all exhibited a sufficient adhesive strength (more than 10 N/25 mm, and in particular 11 N/25 mm or more) suitable for paint film protection, and also had an adhesive transfer surface area of less than 5% with respect to a paint film in a surface state prone to adhesive transfer, thus exhibiting a high adhesive transfer resistance. In addition, the paint film-protecting sheets in these examples exhibited either substantially no webbing (stringing) or no webbing whatsoever. An even better adhesive transfer resistance was achieved with the paint film-protecting sheets in Examples 1 to 3, which had a $Er_{(-5)}/Er_{(25)}$ ratio of 2.0 or less. Also, Examples 1 and 2, in which propylene copolymer having a MFR of from 0.5 to 2.0 g/10 min was used, exhibited a better adhesive transfer resistance than Example 4 in which a propylene copolymer having a higher MFR was used. By contrast, the paint film-protecting sheets in Examples 5 and 6, which did not satisfy above conditions (1) and (2), both had adhesive transfer properties that were clearly inferior to those in Examples 1 to 4.

The embodiments thus disclosed in detail above are to be considered in all respects as illustrative and not limiting. The scope of the invention is indicated by the appended claims rather than by the foregoing description, and all changes which come within the meaning and range of equivalency of the claims are intended to be embraced therein.

INDUSTRIAL APPLICABILITY

The paint film-protecting sheets disclosed herein may be advantageously used in applications, in which the protective sheet is affixed to the paint film on an article to be protected (examples of which include articles having a paint film formed by the above-mentioned painting treatment, such as automotive bodies and automotive components, or a sheet metal such as sheet steel and shaped articles thereof) which have been painted with paints of various compositions, such as acrylic, polyester, alkyd, melamine, urethane or epoxide crosslink-based paints or paints based on combinations thereof (e.g., acrylic melamine or alkyd melamine-based paints), so as to protect the paint film from the impact of very small particles or contact with chemicals. Such sheets are especially suitable as paint film-protecting sheets for automobiles (e.g., for the outer paint film on automotive bodies), which have a high likelihood of being stored outdoors for extended periods of time or of being transported to tropical regions or regions of various other climates and which are subject to strict requirements concerning the appearance and decorativeness of the paint film.

The preferred embodiments were described in combinations of features and steps that may not be necessary to practice the invention in the broadest sense, and such detailed combinations have been described merely for the purpose of particularly describing representative examples of the invention. Furthermore, various features of the above-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Additional teachings relevant to, and advantageously combinable with the present teachings, are found, e.g., in a commonly-owned U.S. Patent Publication No. 2011-0129655, the contents of which are hereby incorporated by reference as if fully set forth herein.

The invention claimed is:

1. A paint film-protecting sheet comprising a supporting substrate and a pressure-sensitive adhesive layer on the supporting substrate, wherein:
    the pressure-sensitive adhesive layer is comprised of a non-crosslinking pressure-sensitive adhesive,
    the supporting substrate is comprised of a resin film which contains one or more polyolefins selected from polyethylene and polypropylene in an amount of at least 50 wt % of the entire supporting substrate,
    the supporting substrate comprises at least a surface portion which adjoins the pressure-sensitive adhesive layer, an outer surface portion and an intermediate portion disposed between the surface portion and the outer surface portion, the surface portion satisfies the following two conditions:
(1) it has an indentation modulus at 25° C. ($Er_{(25)}$) of from 600 MPa to 1,100 MPa, and
(2) it has an indentation modulus at −5° C. ($Er_{(-5)}$) of from 1,000 MPa to 2,400 MPa, the surface portion is comprised of a resin material that comprises linear low-density polyethylene (LLDPE) having a density d of 0.920 g/cm$^3$ or less, 10-40 wt % propylene copolymer and 10-50 wt % homopropylene, the intermediate portion is comprised of a resin material that comprises titanium dioxide particles having $SiO_2$/$Al_2O_3$ coated on the surfaces thereof, the amount of the titanium dioxide particles in the intermediate portion being from 5 to 15 parts by weight per 100 parts by weight of resin components in the resin material, and the paint film-protecting sheet is wound into a roll such that an outer surface of the pressure-sensitive adhesive layer directly contacts a back side of the supporting substrate and the outer surface of the pressure-sensitive adhesive layer is thus protected.

2. The paint film-protecting sheet according to claim 1, wherein the resin material of the surface portion contains at least 20 wt % of the LLDPE having the density d of 0.920 g/cm$^3$ or less.

3. The paint film-protecting sheet according to claim 1, wherein the propylene copolymer has a melt mass flow rate of from 0.5 to 2.0 g/10 min as measured in accordance with JIS K7210 at 230° C. and under a load of 21.18 N by method A.

4. The paint film-protecting sheet according to claim 1, wherein the combined amount of the LLDPE and the propylene copolymer in the resin material of the surface portion is at least 30 wt %.

5. The paint film-protecting sheet according to claim 1, wherein the supporting substrate has a tensile modulus of elasticity at 23° C. of from 350 MPa to 850 MPa.

6. The paint film-protecting sheet according to claim 1, wherein the supporting substrate is a film formed by T-die extrusion.

7. The paint film-protecting sheet according to claim 1, wherein the pressure-sensitive adhesive forming the pressure-sensitive adhesive layer comprises an isobutylene polymer as a base polymer.

8. The paint film-protecting sheet according to claim 7, wherein the combined amount of the LLDPE and the propylene copolymer in the resin material of the surface portion is at least 30 wt %.

9. The paint film-protecting sheet according to claim 8, wherein:
the ratio ($Er_{(-5)}$/$Er_{(25)}$) is between 1.5 and 3.0.

10. The paint film-protecting sheet according to claim 1, wherein:
the surface portion comprises 20-50 wt % of the LLDPE, which has a density d between 0.897-0.920 g/cm$^3$, 10-50 wt % of the homopropylene and 10-25 wt % of the propylene copolymer, which is a block polypropylene,
the outer surface portion comprises 45-60 wt % homopropylene and 25-35 wt % block polypropylene,
the resin components of the intermediate portion comprise 15-25 wt % homopropylene and 65-80 wt % LLDPE, and
the ratio ($Er_{(-5)}$/$Er_{(25)}$) is between 1.5 and 2.2.

11. The paint film-protecting sheet according to claim 1, wherein:
the ratio ($Er_{(-5)}$/$Er_{(25)}$) is between 1.5 and 2.2.

12. The paint film-protecting sheet according to claim 1, further comprising:
a release treatment agent disposed on the back side of the supporting substrate, which back side is opposite of the non-crosslinking pressure-sensitive adhesive, in the form of a thin film having a thickness of from 0.01 µm to 1.0 µm, the release treatment agent comprising at least one selected from the group consisting of a silicone-based release treatment agent, a long-chain alkyl-based release treatment agent and a fluorine-based release treatment agent.

13. The paint film-protecting sheet according to claim 1, wherein the resin material of the surface portion contains the propylene copolymer in an amount of 15 to 25 wt %.

14. A protective sheet suitable for protecting a painted surface comprising:
a support substrate containing at least one polyolefin selected from polyethylene and polypropylene in an amount of at least 50 wt % of the entire support substrate, and
a non-crosslinking pressure-sensitive adhesive disposed on the support substrate,
wherein the support substrate comprises at least a surface portion which adjoins the pressure-sensitive adhesive, an outer surface portion and an intermediate portion disposed between the surface portion and the outer surface portion,
the surface portion satisfies the following two conditions:
(1) it has an indentation modulus at 25° C. ($Er_{(25)}$) between 600-1,100 MPa, and
(2) it has an indentation modulus at −5° C. ($Er_{(-5)}$) between 1,000-2,400 MPa,
the surface portion comprises linear low-density polyethylene (LLDPE) having a density d of 0.920 g/cm$^3$ or less, 10-40 wt % propylene copolymer and 10-50 wt % homopropylene,
the intermediate portion comprises resin components and titanium dioxide particles having $SiO_2$/$Al_2O_3$ coated on the surfaces thereof, the amount of the titanium dioxide particles in the intermediate portion being from 5 to 15 parts by weight per 100 parts by weight of the resin components in the intermediate portion, and
the paint film-protecting sheet is wound into a roll such that an outer surface of the pressure-sensitive adhesive layer directly contacts a rear side of the supporting substrate and the outer surface of the pressure-sensitive adhesive layer is thus protected.

15. The protective sheet according to claim 14, wherein:
the ratio ($Er_{(-5)}$/$Er_{(25)}$) is between 1.5 and 3.0.

16. The protective sheet according to claim 15, wherein:
the ratio ($Er_{(-5)}$/$Er_{(25)}$) is between 1.5 and 2.2.

17. The protective sheet according to claim 16, wherein:
the surface portion comprises 20-50 wt % of the LLDPE, which has a density d between 0.897-0.920 g/cm$^3$, 10-50 wt % of the homopropylene and 10-25 wt % of the propylene copolymer, which is a block polypropylene,
the outer surface portion comprises 45-60 wt % homopropylene and 25-35 wt % block polypropylene, and
the resin components of the intermediate portion comprise 15-25 wt % homopropylene and 65-80 wt % LLDPE.

18. A method for protecting a painted surface of an automobile, comprising:

adhering the protective sheet of claim 17 to the painted surface.

19. A paint film-protecting sheet comprising a supporting substrate and a pressure-sensitive adhesive layer on the supporting substrate, wherein:
- the pressure-sensitive adhesive layer is comprised of a non-crosslinking pressure-sensitive adhesive,
- the supporting substrate is comprised of a resin film which contains one or more polyolefins selected from polyethylene and polypropylene in an amount of at least 50 wt % of the entire supporting substrate,
- the supporting substrate comprises at least a surface portion which adjoins the pressure-sensitive adhesive layer, an outer surface portion and an intermediate portion disposed between the surface portion and the outer surface portion,
- the surface portion comprises LLDPE having a density d of 0.925 g/cm$^3$ or less and 10-50 wt % homopolypropylene, and the surface portion has an indentation modulus at 25° C. ($Er_{(25)}$) of from 200 MPa to 1,100 MPa, and has an indentation modulus at −5° C. ($Er_{(-5)}$) of from 400 MPa to 2,400 MPa,
- the intermediate portion comprises titanium dioxide particles having $SiO_2/Al_2O_3$ coated on the surfaces thereof, the amount of the titanium dioxide particles in the intermediate portion being from 5 to 15 parts by weight per 100 parts by weight of resin components in the intermediate portion, and
- the paint film-protecting sheet is wound into a roll such that an outer surface of the pressure-sensitive adhesive layer directly contacts a back side of the supporting substrate and the outer surface of the pressure-sensitive adhesive layer is thus protected.

20. The paint film-protecting sheet according to claim 19, wherein the LLDPE comprised in the surface portion has a density d of 0.920 g/cm$^3$ or less.

* * * * *